United States Patent
House

[15] 3,701,396
[45] Oct. 31, 1972

[54] OPERATING APPARATUS FOR CART

[72] Inventor: Bruce F. House, Miami, Fla.

[73] Assignee: Shelley Manufacturing Company, Miami, Fla.

[22] Filed: Feb. 16, 1971

[21] Appl. No.: 115,313

[52] U.S. Cl. .......................... 188/21, 188/32, 188/5, 244/118 R
[51] Int. Cl. ............................. B60t 1/02, B60t 1/14
[58] Field of Search............188/5, 19, 20, 21, 29, 32, 188/2 R, 106 R; 244/118 R

[56] References Cited

UNITED STATES PATENTS

| | | | |
|---|---|---|---|
| 607,329 | 7/1898 | Beebe...................... | 188/21 X |
| 1,496,548 | 6/1924 | Knight................... | 188/21 UX |
| 3,095,211 | 6/1963 | Altherr.................... | 188/21 X |
| 3,313,377 | 4/1967 | Aninger......................... | 188/5 |
| 3,610,372 | 10/1971 | Warren........................ | 188/32 |

*Primary Examiner*—Duane A. Reger
*Attorney*—Settle & Oltman

[57] ABSTRACT

A wheeled vehicle which can be moved in either of two opposite directions has an operating mechanism including a brake shoe normally engaging a wheel of the vehicle, one actuator at one end of the vehicle and another actuator at the opposite end of the vehicle, the actuators being coupled to the brake shoe so that by operating either actuator the brake shoe can be released for movement of the cart in either direction. Thus, a stewardess, for example, can use the cart to dispense beverages, and can use the actuators as handles whereby she can push the cart from either end and at the same time release the brake. The operating apparatus also preferably includes an anchoring means for engaging a floor mounted stud to moor the vehicle, the anchoring means including two spaced members adapted to capture the stud between them and each movable by operation of one of the actuators. Thus, when the stewardess releases the brake, she also releases an anchoring member so that the cart can be moved away from the stationary stud. The linkage or coupling between the actuators and the brake shoes includes a sliding connector which provides for simultaneous operation of two brakes.

10 Claims, 11 Drawing Figures

INVENTOR.
BRUCE F. HOUSE
BY
SETTLE & OLTMAN
ATTORNEYS

PATENTED OCT 31 1972

INVENTOR.
BRUCE F. HOUSE
BY
SETTLE & OLTMAN
ATTORNEYS

PATENTED OCT 31 1972 3,701,396

INVENTOR.
BRUCE F. HOUSE
BY
SETTLE & OLTMAN
ATTORNEYS

OPERATING APPARATUS FOR CART

BACKGROUND OF THE INVENTION

One type of known cart intended for use on aircraft as a beverage dispensing cart has a brake in the form of a foot which engages the floor of the aircraft to stop the cart. A problem with this type of brake is that if the aircraft tilts severely, the cart may slide, and the brake will rip up the carpeting on the floor of the aircraft. Furthermore, when the cart is stored on the aircraft in flight, the same foot is used as a brake to hold the cart stationary, and this does not anchor the cart firmly enough to withstand maneuvers which the aircraft might be required to perform, particularly in bad weather or emergency conditions.

SUMMARY OF THE INVENTION

The present invention provides an operating mechanism for a wheeled vehicle in which a brake applied to the wheel of the vehicle safely brakes the vehicle for normal flight conditions, and an anchoring structure moors the vehicle to a floor mounted stud when the vehicle is stored on the aircraft. Thus, the vehicle has a brake and a separate anchoring mechanism. Both the brake and the anchoring mechanism are released by operation of handles which are located at opposite ends of the cart. In a particular embodiment, a stewardess merely raises one of the handles to release both the brake and the anchoring mechanism, and then pushes the cart with the same handle. In order to move the cart in the opposite direction, she merely operates the handle at the opposite end of the cart. Accordingly, it is an object of the present invention to provide a cart with an operating apparatus including both a brake and an anchoring mechanism.

Another object of the invention is to enable an operator to actuate the brake and the anchoring mechanism simultaneously.

A further object of the invention is to enable an operator to actuate both the brake and the anchoring mechanism from either end of the cart alternatively.

Still another object of the invention is to provide an operating apparatus for a cart with a brake and/or an anchoring mechanism, and with at least one actuator which can be operated to release the brake and/or the anchoring mechanism and also to push the cart.

Among the other objects of the invention are to provide an operating apparatus for a cart which is economical to manufacture, reliable in operation, rugged in use, and in which the parts cooperate in an unexpectedly advantageous manner.

Other objects of this invention will appear from the following description and appended claims, reference being had to the accompanying drawings forming a part of this specification wherein like reference characters designate corresponding parts in the several views.

Figures 1, 2:
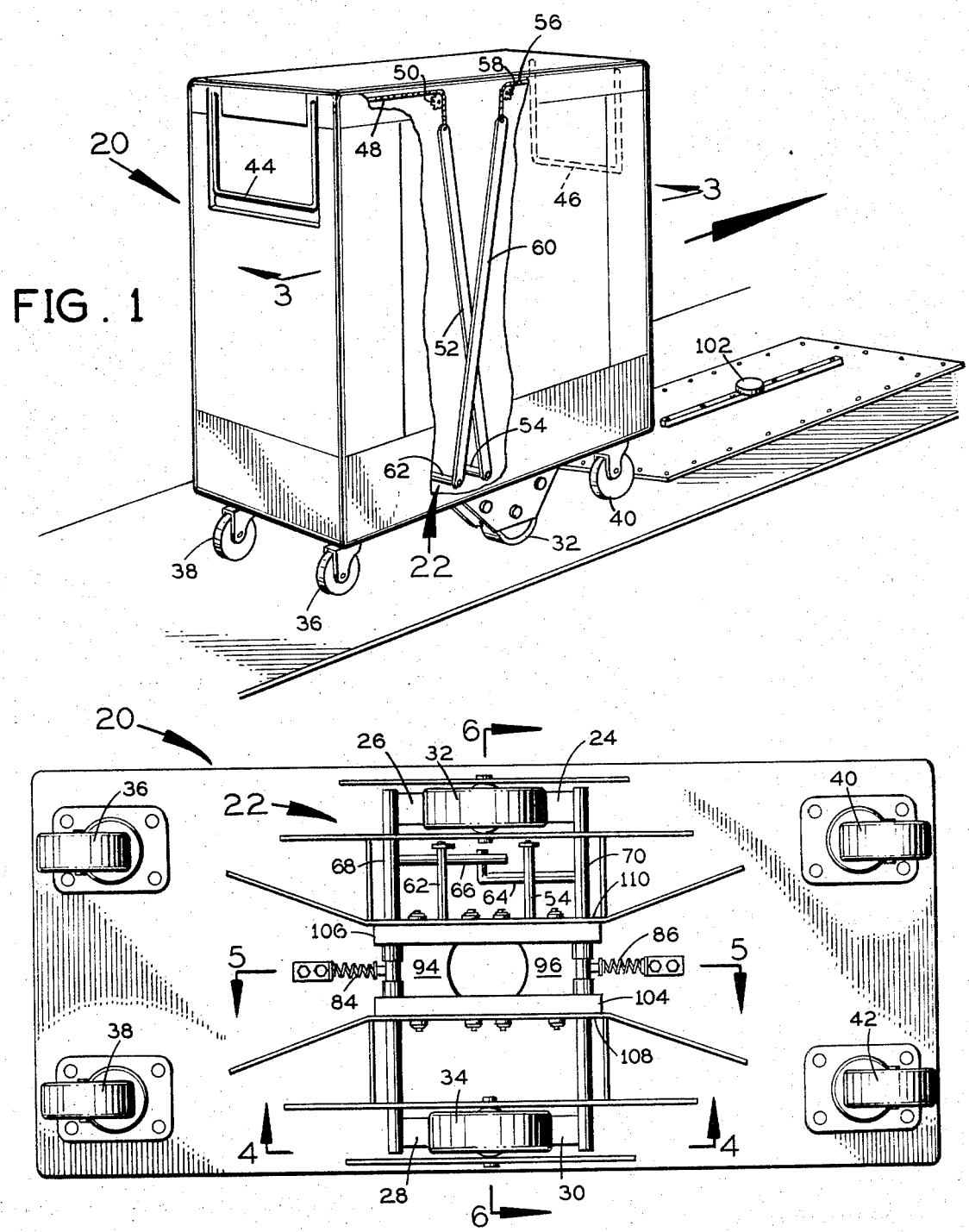
FIG. 1 is a perspective view of a cart having an operating apparatus in accordance with one embodiment of the invention.
FIG. 2 is a bottom plan view of the cart showing part of the operating apparatus.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS:

The cart 20 is particularly suited for use on commercial airliners as a beverage dispensing cart. Details of the beverage dispensing features of the cart will not be described herein since they are not pertinent to the invention. It may be noted, however, that the cart is relatively narrow so that it can be moved up and down the aisles of an aircraft in the the beverage dispensing application, and the cart can be moved in either a forward or the reverse direction.

The cart 20 has an operating apparatus generally designated 22 which includes a braking mechanism and an anchoring mechanism. In this particular embodiment, the braking mechanism includes four brake shoes 24, 26, 28 and 30. Only one brake shoe would be necessary, but for best results, multiple brake shoes are desirable. Brake shoes 24 and 26 normally engage a wheel 32, and brake shoes 28 and 30 normally engage another wheel 34. Additional wheels such as 36, 38, 40 and 42 may be provided.

The operating apparatus 22 also includes two actuators in the form of handles 44 and 46 which are located at opposite ends of the cart 20 and enable the stewardess to operate the cart. In this embodiment, the stewardess releases both brakes and the actuating mechanism merely by raising one of the handles. She can then push the cart forward merely by pushing on the handle she has already raised. She can move the cart in reverse by pulling on the same handle. Alternatively, the stewardess may operate the other handle, and this handle will also release both the brakes and the anchoring mechanism. Again, the cart may be pushed forward by pushing on the handle and pulled in reverse by pulling on the handle.

THE BRAKES

The structure and operation of the brakes will be described particularly with reference to FIGS. 1 through 7. Handle 44 is connected by a cable or chain 48 running over a pulley 50 to a rod 52 which extends downwardly and has at its lower end a transversely extending rod 54. Similarly, handle 46 is connected by a cable or chain 56 running over a pulley 58 to a rod 60 which extends downwardly and has at its lower end a transversely extending rod 62. Rods 54 and 62 are located immediately under a connector mechanism which includes arms 64 and 66.

Figure 7:
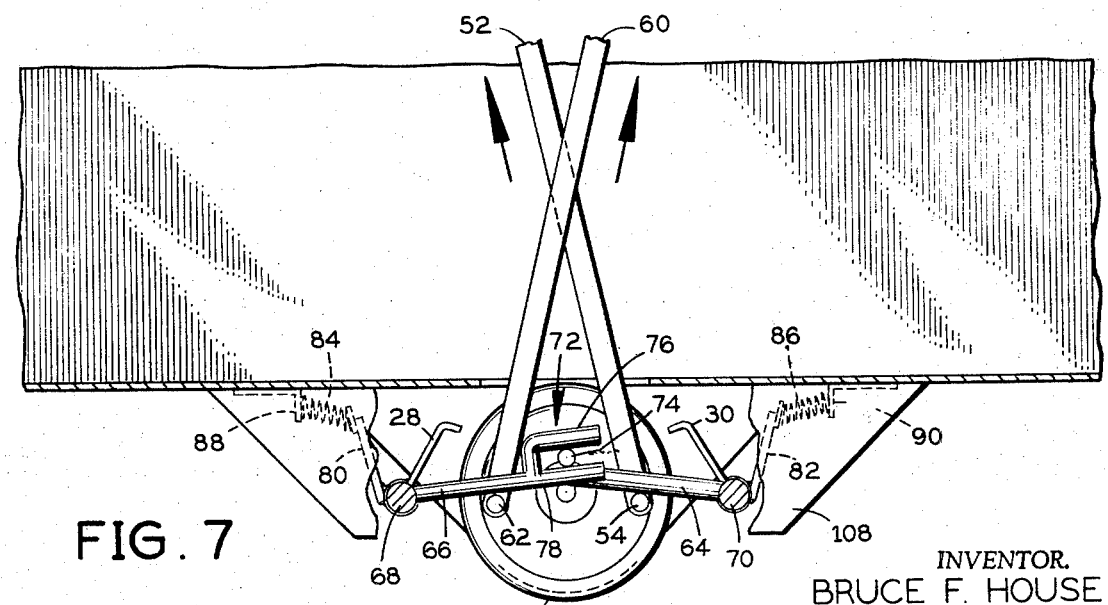
FIG. 7 is an enlarged fragmentary sectional view similar to FIG. 3.

Referring to FIGS. 2 and 7, it may be seen that arm 66 is connected to a shaft 68 which in turn is connected to brake shoes 26 and 28. Similarly, arm 64 is connected to a shaft 70 which in turn is connected to brake shoes 24 and 30. When the handles 44 and 46 are raised to the positions shown in dashed lines in FIG. 3, the rods 54 and 62 rise to lift arms 64 and 66, thus pivoting the brake shoes 24, 26, 28 and 30 away from the wheels 32 and 34. This releases the brakes so that the cart can be moved.

It may be noted that if either one of the handles is raised, all of the brakes are released. Thus, if handle 44 is raised, rod 54 rises to lift arm 64 and thus pivot brake shoes 24 and 30 away from wheels 32 and 34. By means of a sliding connection 72 between the two arms 64 and 66, the other arm 66 is also lifted by rod 34 to rotate shaft 68 and pivot brake shoes 26 and 28 away from wheels 32 and 34. Thus, all of the brake shoes are released. If only handle 46 is raised, rod 62 rises to lift both arms 64 and 66 and thus pivot all the brake shoes away from the wheels.

The sliding connection between arms 64 and 66 includes a slotted portion of arm 66 in which a stub portion 74 of arm 64 is slidably received. The slot in arm 66 is formed by two legs 76 and 78 of the arm 66.

The brake shoes are returned to their engaged positions when the handles are released. This is accomplished by means of plates 80 and 82 which are fastened as by welding to the shafts 68 and 70 respectively, and which are spring biased by springs 84 and 86. These springs may be trapped between the plates 80 and 82 and the flanges 88 and 90 secured to the underside of the cart as shown in FIG. 5.

THE ANCHORING MECHANISM

Figure 5:
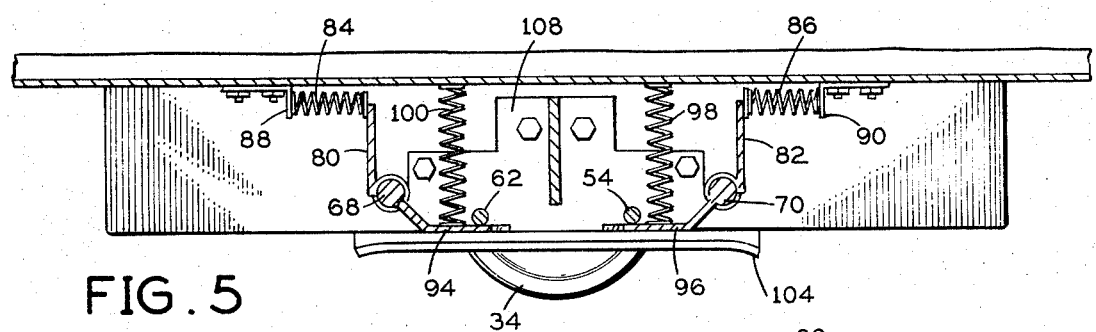
FIG. 5 is another fragmentary sectional view taken along plane 5—5 of FIG. 2 looking in the direction of the arrows.
Figure 6:
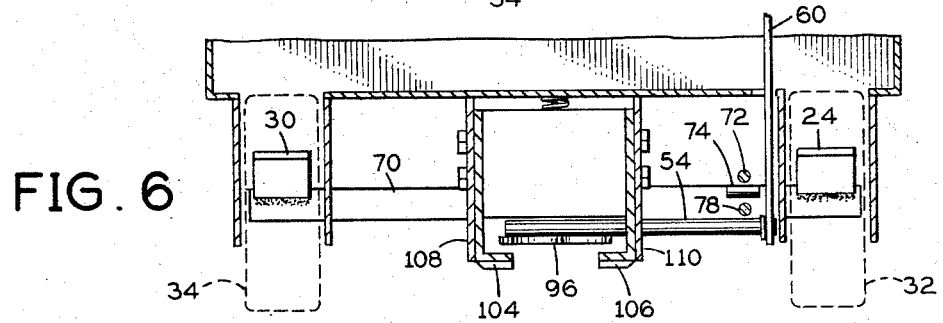
FIG. 6 is a fragmentary cross sectional view taken along plane 6—6 of FIG. 2 looking in the direction of the arrows.

As shown, for example, in FIG. 5 and 6, the rods 54 and 62 extend through openings in a partition plate 110 and are attached respectively to anchoring members 96 and 94. The members 96 and 94 are free to pivot on shafts 70 and 68 respectively without turning those shafts. Members 94 and 96 are biased to a horizontal position as shown, for example in FIG. 5, by means of springs 98 and 100. Members 94 and 96 are spaced apart horizontally and have inner edges designed to capture a stationary stud 102 which is shown in an exposed condition in FIG. 1. The stud 102 is anchored firmly to the floor of the aircraft, and when the anchoring mechanism is engaged with the stud 102, the cart 20 is firmly moored to the aircraft.

Figure 3:
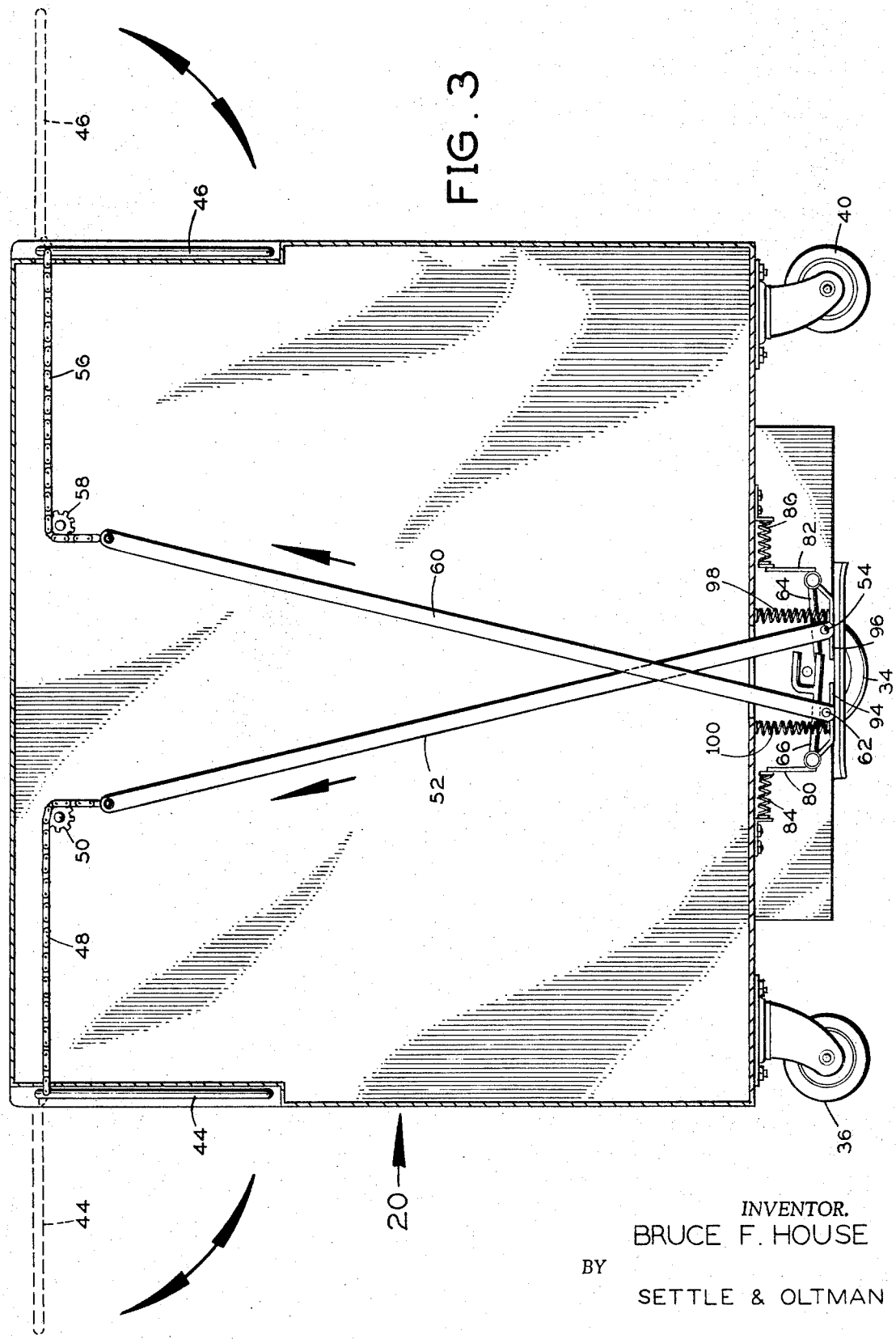
FIG. 3 is a sectional view taken along plane 3—3 of FIG. 1 and looking in the direction of the arrows.
Figure 4:
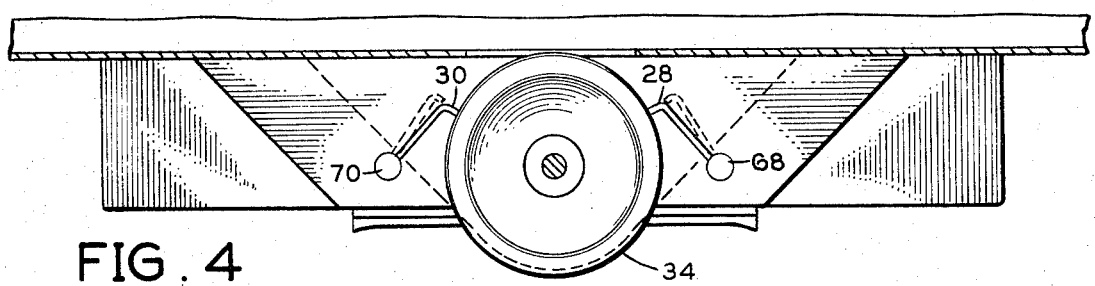
FIG. 4 is a fragmentary sectional view taken along plane 4—4 of FIG. 2 looking in the direction of the arrows.

It will be apparent that when handle 44 is raised in the manner shown in FIG. 3, bar 54 rises to lift anchoring member 96 and thus release the stud. Anchoring member 94 does not rise when handle 44 is raised. On the other hand, when handle 46 is raised, bar 62 rises to lift anchoring member 94, and anchoring member 96 does not rise in this condition. Thus, handle 44 operates only the forward anchoring member 96 as viewed when the stewardess is standing adjacent handle 44, and conversely, handle 46 operates only the forward anchoring member 94 as viewed when the stewardess is standing adjacent the handle 46.

Figure 8:
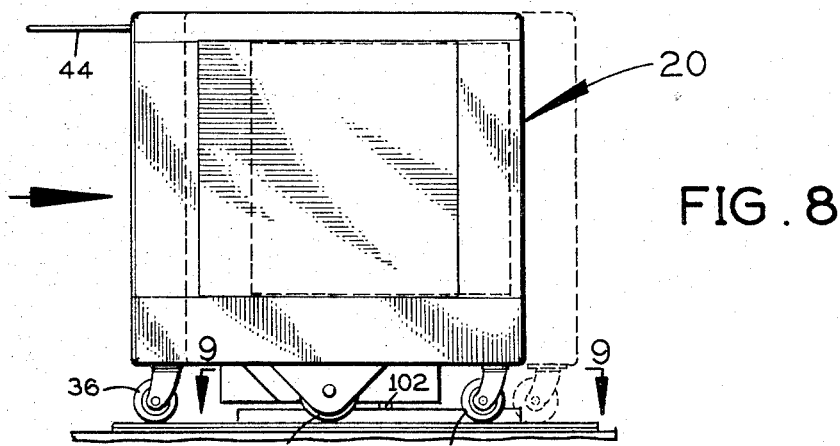
FIG. 8 is a schematic view of the cart on a reduced scale as compared to FIG. 1 and showing the cart being moved onto a mooring stud in the floor of an aircraft.
Figure 9:
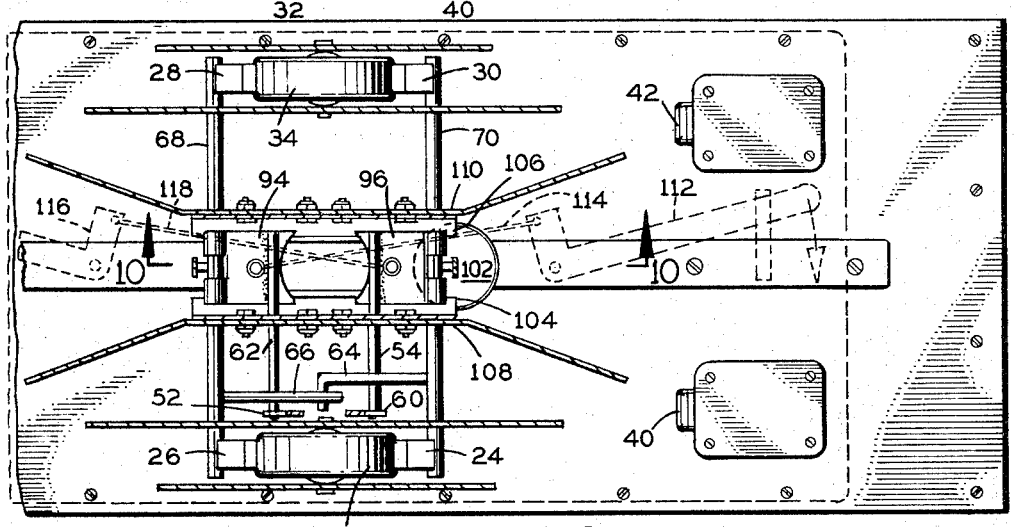
FIG. 9 is a sectional view taken along plane 9—9 of FIG. 8 and looking in the direction of the arrows to show the operating apparatus as it approaches the stud.
Figure 10:
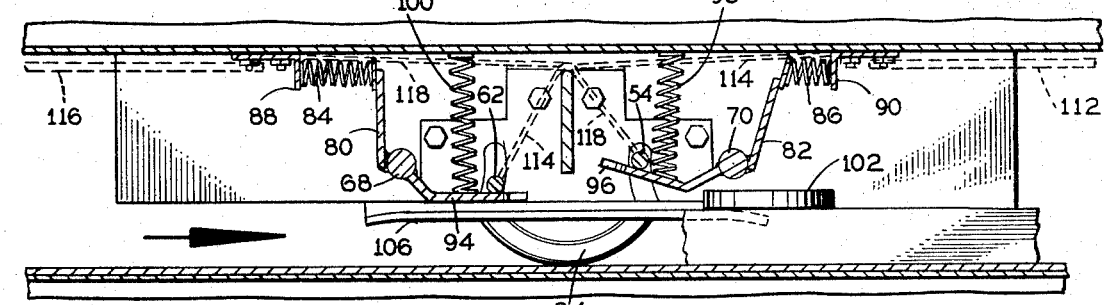
FIG. 10 is a fragmentary sectional view taken along plane 10—10 of FIG. 9 looking in the direction of the arrows.
Figure 11:
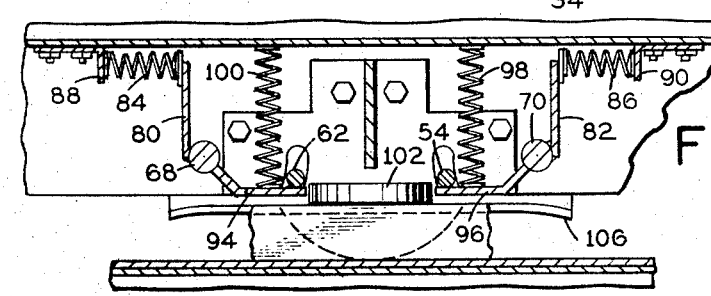
FIG. 11 is a fragmentary sectional view similar to FIG. 10, but showing the anchoring means as it engages the mooring stud.

FIG. 8 through 11 show the operation of the anchoring mechanism. In FIG. 8, the cart 20 is shown as it is being pushed over the stationary stud 102 by means of the handle 44 which is shown in a raised position. As shown in FIG. 10, with handle 44 raised, the forward anchoring member 96 is also raised, whereas the rear anchoring member 94 is lowered. Incidentally, all of the brakes are released. The cart is pushed forward until the stud 102 is located between the anchoring members 94 and 96, and at this time the rear anchoring member 94 engages the stud. This serves to stop the cart. The handle 44 may then be lowered, and this lowers anchoring member 96 so that the stud 102 is captured between the anchoring members as shown in FIG. 11.

The stud 102 has a mushroom shape, and the cart has rails or lips 104 and 106 attached respectively to partitions 108 and 110, and these lips slide under the edge of the mushroom 102 so that the cart cannot lift off the mushroom. Thus, as shown in FIG. 11, the cart is anchored to the mushroom not only by members 94 and 96 but also by lips 104 and 106.

To remove the cart from the mushroom, the operator merely lifts handle 44 and pulls the cart in the reverse direction, when handle 44 is raised, the forward anchoring member 96 is raised to release the mushroom and all of the brake shoes are pivoted away from the wheels as previously described.

Auxiliary actuators for the anchoring members may be provided. Thus, a lever 112 pivotally connected to the underside of the frame is connected by a cable 114 to the anchoring member 94. Similarly, another lever 116 pivotally connected to the underside of the frame is connected by another cable 118 to the other anchoring member 96. The levers 112 and 116 could be operated to raise the appropriate anchoring member if, for some reason, one of the regular or primary actuating handles 44 and 46 were out of order.

CONCLUSION

The invention provides an operating apparatus for a cart which includes both brakes and an anchoring mechanism. Both the brakes and the anchoring mechanism are operated by actuator means which preferably includes an actuator at each end of the cart. All brakes are released by each actuator, whereas only one anchoring member is released by each actuator. With this arrangement, the cart can be quickly and easily moored firmly to the aircraft, and also can be released from the mooring stud. The brakes are applied and released by operation of the same actuators which operate the anchoring mechanism.

Having thus described my invention, I claim:

1. In a wheeled vehicle adapted to be moved in either of two opposite directions, an operating apparatus comprising:
   a. a brake shoe normally engaging a wheel of the vehicle,
   b. a first actuator at one end of said vehicle,
   c. a second actuator at the opposite end of said vehicle, d. means coupling said first actuator to said brake shoe for causing said shoe to disengage from said wheel upon operation of said first actuator,
e. means coupling said second actuator to said brake shoe for causing said brake shoe to disengage from said wheel upon operation of said second actuator, and
f. anchoring means for engaging a floor mounted stud to moor said vehicle,
g. said anchoring means including two members spaced to capture the stud between the same and each movable to release the stud,
h. one of said members being movable by said coupling means for said first actuator and the other of said members being movable by said coupling means for said second actuator.

2. The operating apparatus as claimed in claim 1 including a second brake shoe normally engaging said wheel, said coupling means causing both of said brake shoes to be disengaged from said wheel when either of said actuators is operated.

3. The operating apparatus as claimed in claim 2 in which said first brake shoe is on one side of said wheel and said second brake shoe is on the opposite side of said wheel, and said coupling means includes connector means operatively interconnecting said brake shoes for simultaneous operation thereof, said first and second actuators both being operatively connected to said connector means.

4. The operating apparatus as claimed in claim 3 in which said connector means includes first and second shafts respectively pivoting said brake shoes, and first and second arms connected from said shafts to each other by a slotted portion of said first arm slidably receiving a stub portion of said second arm.

5. The operating apparatus as claimed in claim 4 in which said first actuator is connected to said first arm and said second actuator is connected to said second arm.

6. The operating apparatus as claimed in claim 1 in which said members are movable independently of each other.

7. In a wheeled vehicle adapted to be moved in either of two opposite directions, an operating apparatus comprising:
a. an anchoring means including first and second members spaced to capture a stationary stud between the same and each individually movable to release the stud,
b. a first actuator at one end of said vehicle,
c. a second actuator at the other end of said vehicle,
d. means coupling said first actuator to one of said anchoring members for moving said member to release the stud, and
e. means coupling said second actuator to the other of said anchoring members for moving said member to release the stud.

8. The operating apparatus as claimed in claim 7 including a brake shoe normally engaging a wheel of said vehicle and connected by said respective coupling means to both of said actuators so that said brake shoe may be disengaged from said wheel by operation of either of said actuators.

9. In a wheeled vehicle, an operating apparatus comprising:
a. a first actuator,
b. first and second brake shoes both normally engaging the same wheel of said vehicle,
c. coupling means operatively connecting said actuator to both of said brake shoes for causing said shoes to disengage from said wheel upon operation of said actuator,
d. said coupling means including connector means operatively interconnecting said brake shoes for simultaneous operation thereof,
e. said connector means including first and second arms connected from said brake shoes to each other by a sliding connection,
f. said sliding connection including a slotted portion of one of said arms slidably receiving a stub portion of the other arm,
g. a second actuator on said vehicle,
h. means coupling said second actuator to one of said arms for causing said brake shoes to disengage from said wheel upon operation of said second actuator, and
i. anchoring means for engaging a floor mounted stud and including two members spaced to capture the stud between the same and each movable to release the stud, one of said members being movable by said first actuator and the other of said members being movable by said second actuator.

10. The operating apparatus as claimed in claim 9 including third and fourth actuators independently coupled to said first and second anchoring members respectively for back up use in releasing said members from said stud.

* * * * *